UNITED STATES PATENT OFFICE.

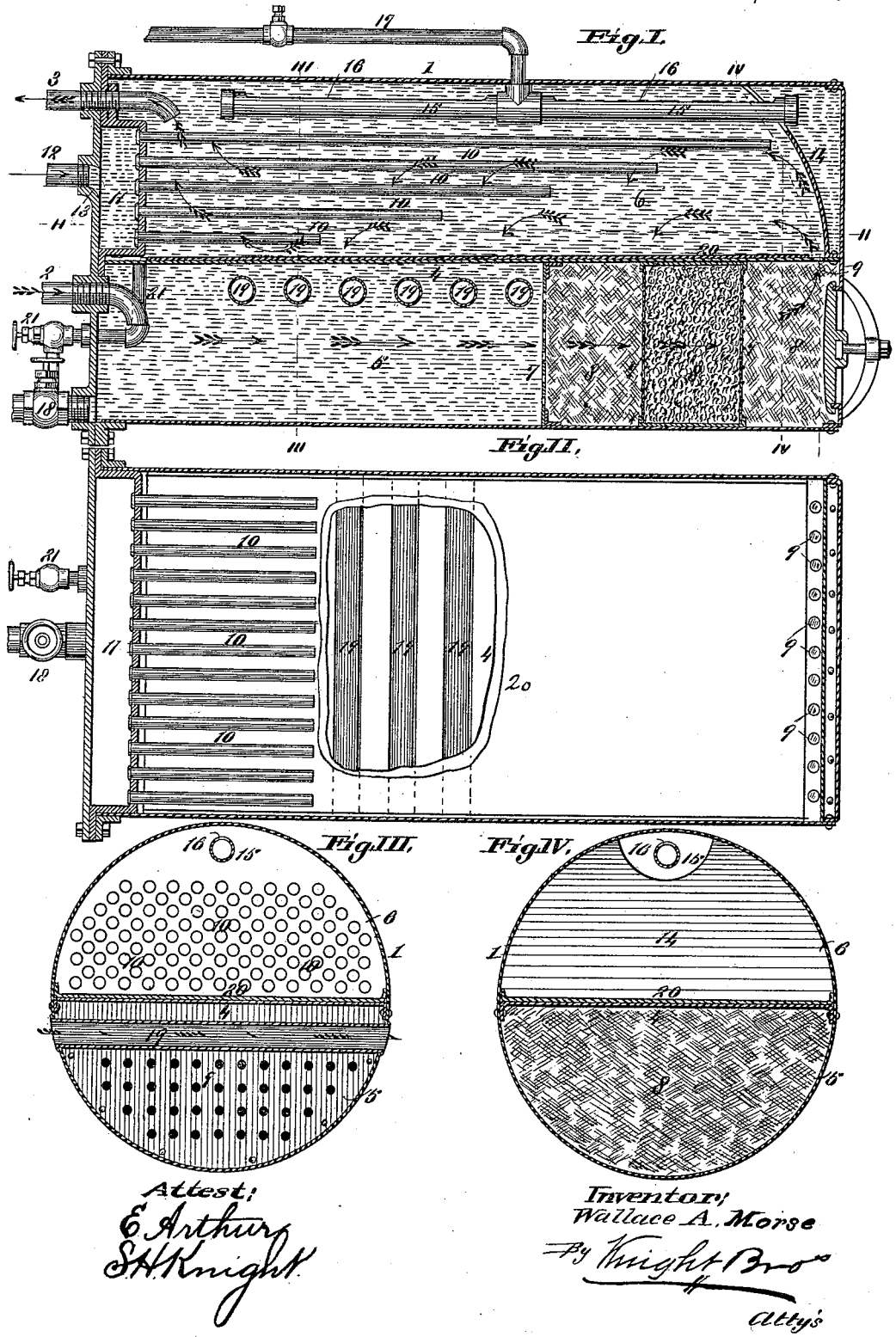

WALLACE A. MORSE, OF ST. LOUIS, MISSOURI, ASSIGNOR OF ONE-HALF TO JOHN O'BRIEN, OF SAME PLACE.

FEED-WATER HEATER AND PURIFIER.

SPECIFICATION forming part of Letters Patent No. 448,984, dated March 24, 1891.

Application filed August 20, 1890. Serial No. 362,502. (No model.)

*To all whom it may concern:*

Be it known that I, WALLACE A. MORSE, of the city of St. Louis, in the State of Missouri, have invented a certain new and useful Improvement in Feed-Water Heaters and Purifiers, of which the following is a full, clear, and exact description, reference being had to the accompanying drawings, forming part of this specification.

My invention relates to an improved device for heating and purifying water for steam-boilers.

My invention consists in features of novelty hereinafter fully described, and pointed out in the claims.

Figure I is a vertical longitudinal section through my improved heater and purifier. Fig. II is a horizontal longitudinal section taken on line II II, Fig. I. Fig. III is a vertical transverse section taken on line III III, Fig. I. Fig. IV is a similar view taken on line IV IV, Fig. I.

Referring to the drawings, 1 represents the outer shell or casing of the heater and purifier, and which may be of any desired size or shape.

2 represents the induction, and 3 the eduction, pipe, the former communicating with the lower and the latter with the upper part of the shell. The shell is divided longitudinally by a diaphragm 4, forming a lower water-chamber 5, into which the pipe 2 discharges, and an upper water-chamber 6, from which the pipe 3 takes the water. At the far end of the chamber 5 from the pipe 2, I arrange a filter for removing the impurities carried by suspension in the water. The filter is preferably composed of perforated or wire-gauze vertical plates 7, forming compartments 8, in the outside ones of which straw or its equivalent would be placed, and in the central one charcoal or its equivalent would be placed. The water entering the chamber 5 from the pipe 2 passes, as indicated by the arrows, backwardly through the filter and enters the chamber 6 through an opening or openings 9 in the diaphragm 4, and thence passes forwardly through the chamber 6 to the outlet or eduction pipe 3, which carries it to the boiler. In the chamber 6 the water is heated to a high temperature and the impurities carried by solution are deposited on the upper surface of the diaphragm 4; or, if preferred, a pan 20 may be placed on the diaphragm, which would collect the sediment or impurities, and which can be taken out and cleaned as often as may be desired by removing the head of the shell. This pan, it will be seen, has its side flanges fitting against the sides of the shell, so as to catch the sediment from the whole volume of water in the chamber 6, the openings 9 in the diaphragm being arranged at the end of the pan remote from the eduction-pipe.

21 represents a pipe, forming a communication between the upper surface of the diaphragm and the outside of the shell, through which such sediment as can be blown out may be removed. The water is heated in the chamber 6 by steam or hot air, injected through tubes 10, having their extremities arranged below the water-line, which preferably decrease in length downwardly in an oblique line, as shown in Fig. I. The tubes 10 communicate at their outer ends with a chamber 11, with which also communicates a hot-air or steam pipe 12, fitting in a perforation 13, in the head of the shell, the inner end of the perforation being presented, as shown in Fig. I, in a downwardly direction, so as to cause an outward circulation through the lower tubes 10 and an inward circulation through the upper tubes 10, it being understood that the current of hot air or steam entering the chamber 11 and being deflected downwardly will be caused to pass largely through the lower tubes 10, causing an inward circulation of water through the upper tubes 10 into the chamber 11, which is carried outwardly again through the lower tubes 10, and thus the current of water continues, and it becomes thoroughly heated. The described circulation of water is facilitated by making the tubes 10 longer at top than bottom, as the cold water upon first entering the chamber 6 is carried or a portion of it is carried through the long upper tubes (which extend nearly to the inner end of the chamber) directly to the chamber 11.

14 represents a deflecting plate, located at the inner end of the chamber 6 and which serves to direct the water as it comes from the chamber 5 toward the tubes 10, and thus assists in the circulation of the water through the pipes.

15 represents a scum-remover consisting of a tube located in the upper part of the chamber 6 and having its upper surface removed, as shown at 16, to permit the scum to enter it and be removed through a pipe 17. This forms a cheap, effectual, and durable scum-remover.

18 represents a sediment blow-off pipe communicating with the lower part of the chamber 5.

I prefer in some instances to heat the water in the chamber 5, and this I do by arranging a number of hot-air or steam tubes 19 in the shell beneath the diaphragm 4 and which traverse the chamber 5, as shown clearly in Figs. I and III. By passing hot air or steam through these tubes the water may be heated as it passes through the chamber 5.

I claim as my invention—

1. In a feed-water heater, the combination of a shell, a diaphragm arranged horizontally within the shell forming upper and lower water-chambers and having an opening for the passage of the water, an induction-pipe communicating with the lower chamber and eduction-pipe communicating with the upper chamber, and transverse heating-pipes 19, traversing said lower chamber, substantially as set forth.

2. In a feed-water heater, the combination of a shell, a diaphragm arranged horizontally within the shell forming upper and lower water-chambers, induction and eduction pipes, and a pan 20, located on said diaphragm and having its side flanges fitting against the walls of the boiler, as shown, and said diaphragm having an opening for the passage of water at the end of said pan remote from the said eduction-pipe, substantially as and for the purpose set forth.

3. In a feed-water heater, the combination of the shell having induction and eduction pipes and the tubes 10, arranged within the shell and having communication with the interior thereof and with a heating-pipe for discharging the heating medium throughout the water, substantially as and for the purpose set forth.

4. In a feed-water heater, the combination of the shell having induction and eduction pipes, and the tubes 10, varying in length and communicating with a heating-pipe and with the interior of the shell for discharging the heating medium throughout the water, substantially as and for the purpose set forth.

5. In a feed-water heater, the combination of the shell having induction and eduction pipes and an enlarged chamber 11, a heating-pipe communicating with said chamber, and tubes 10, located within the boiler and communicating with the interior thereof and with said chamber and terminating below the water-line, substantially as and for the purpose set forth.

6. In a feed-water heater, the combination of the shell having induction and eduction pipes and a chamber 11, a heating-pipe communicating with said chamber by an opening presented in a downward direction, and tubes 10, communicating with said chamber and with the interior of the heater and having their extremities arranged in an oblique line, substantially as and for the purpose set forth.

7. In a feed-water heater, the combination of the shell having a diaphragm 4 and induction and eduction pipes, the tubes 10, open at their inner ends and communicating with a heating-pipe, and the deflecting-plate 14, substantially as and for the purpose set forth.

8. In a feed-water heater, the combination of the shell, the chamber 11, located at one end of said shell, the deflecting-plate 14, located at the other end of said shell, the tubes 10, open at both ends, extending from said chamber 11 toward said deflecting-plate and being of various lengths, an induction-pipe below said tubes, an eduction-pipe above said tubes, and a heating-pipe discharging into said chamber 11, substantially as set forth.

WALLACE A. MORSE.

In presence of—
 E. S. KNIGHT,
 A. M. EBERSOLE.